United States Patent [19]

Moraw et al.

[11] 4,324,421
[45] Apr. 13, 1982

[54] IDENTITY CARD WITH INCORPORATED FIBRIDS

[75] Inventors: Roland Moraw, Wiesbaden; Peter Steinau, Mainz; Fritz Pierson, Taunusstein-Hahn, all of Fed. Rep. of Germany

[73] Assignee: Hoechst Aktiengesellschaft, Frankfurt am Main, Fed. Rep. of Germany

[21] Appl. No.: 105,147

[22] Filed: Dec. 19, 1979

[30] Foreign Application Priority Data

Dec. 30, 1978 [DE] Fed. Rep. of Germany ....... 2856852

[51] Int. Cl.³ .......................... B42D 15/00; G09F 3/02
[52] U.S. Cl. .......................... 283/7; 40/2.2; 428/916
[58] Field of Search ................. 40/2.2; 428/280, 281, 428/288, 296, 325, 900, 915, 916; 283/7, 8, 9

[56] References Cited

U.S. PATENT DOCUMENTS

| 2,246,541 | 6/1941 | Sherman | 428/916 X |
|---|---|---|---|
| 2,588,067 | 3/1952 | Whitehead | 428/916 X |
| 3,080,272 | 3/1963 | Jackson | 428/323 X |
| 3,117,055 | 1/1964 | Guandique | 428/360 X |
| 3,457,661 | 7/1969 | Peters | 428/916 X |
| 3,545,380 | 12/1970 | Comegys | 428/916 X |
| 3,864,855 | 2/1975 | Pekko | 428/916 X |
| 3,871,119 | 3/1975 | Mayer | 40/2.2 X |
| 3,874,979 | 4/1975 | Hannon | 428/916 X |
| 3,880,706 | 4/1975 | Williams | 283/9 R X |
| 4,017,834 | 4/1977 | Cuttill | 283/7 X |
| 4,031,283 | 6/1977 | Fagan | 428/280 |
| 4,041,203 | 8/1977 | Brock | 428/296 X |
| 4,051,295 | 9/1977 | Bernstein | 428/916 X |
| 4,091,137 | 5/1978 | Miller | 428/280 X |
| 4,096,015 | 6/1978 | Kawamata | 428/916 X |
| 4,119,361 | 10/1978 | Greenaway | 283/7 X |
| 4,173,675 | 11/1979 | Vallon et al. | 428/280 X |

FOREIGN PATENT DOCUMENTS 2308876 9/1973 Fed. Rep. of Germany .
2163943 9/1975 Fed. Rep. of Germany .

Primary Examiner—Paul A. Bell
Assistant Examiner—John S. Brown
Attorney, Agent, or Firm—Schwartz, Jeffery, Schwaab, Mack, Blumenthal & Koch

[57]  ABSTRACT

An identity card comprising at least one outer transparent thermoplastic covering layer and a thermoplastic core layer; said card carrying at suitable points on at least one layer information which serves to identify the cardholder; said card further carrying security markings, such as guilloche figures, as a protection against forgeries; said core layer comprising incorporated fibrids. In a preferred embodiment, the core layer is a paper felt enriched with at least 80% by weight fibrids of a polyolefin, such as polyethylene, and comprising from 8 to 14% by weight pigment material, such as titanium dioxide. The core layer may also be provided with a reinforcing layer, such as a randomly perforated paper or polyester film, which is dimensionally stable during lamination of the layers under pressure at elevated temperatures of up to 180° C.

17 Claims, 4 Drawing Figures

IDENTITY CARD WITH INCORPORATED FIBRIDS

This invention relates to an identity card comprising at least one outer transparent thermoplastic covering layer and a thermoplastic core layer and carrying at a suitable point on one or more layers, information which serves to identify the cardholder, and having additional security markings, such as guilloche figures, as protection against forgeries.

BACKGROUND OF THE INVENTION

Cards of this type are increasingly used as information carriers or data carriers for passports, check cashing cards, credit cards, drivers licenses, identification cards, pass cards and similar means of identification which must be protected both against complete forgeries by means of imitated cards and against falsifications by partial alteration of the data relating to the holder.

Known identity cards are manufactured in the form of a fused laminate in which a card core carrying the information is protected by transparent films differing in nature from the card core. German Offenlegungsschrift No. 2,308,876 describes an identity card consisting of a relatively thick carrier film and a thin transparent film, between which there is a special paper having internal features, such as watermarks, banknote print or the like, which serve as protection against forgeries and cause differences in the thickness of the paper. The three layers are laminated together in such a way that the internal features are manually, mechanically and/or visually detectable through the transparent film. Further markings which serve to identity the cardholder are provided at a suitable point in this known identity card. For example, a photograph in the form of a film transparency is inserted during lamination between the special paper and the carrier film and is firmly bonded to the special paper. Furthermore, it is possible, at any desired point on the front or rear of the identity card, to laminate onto the outside of the plastic material a strip of special paper printed according to security technology as a field for later signatures or other handwritten entries.

German Auslegeschrift No. 2,163,943 discloses a personal identity card comprising a combination of a support layer, an electrically conductive layer, a barrier layer, a photoconductive layer with an organic photoconductor, an optional covering layer, a protective layer on the photoconductive layer or the covering layer, a protective layer on the rear of the support layer, and an optional covering layer on the last-mentioned protective layer. In this personal identity card, a number of different materials are assembled to give a laminate which, due to the lack of homogeneity of the individual layers, can be split up so that it is possible to carry out forgeries. The manufacture of this personal identity card is carried out in such a way that the requisite data are printed with the aid of an offset-printing machine onto the inside of a transport, non-plastic polyvinyl chloride film. Over this, a layer of printing ink is printed which has a high hiding power and leaves only those areas free, which are envisaged for the signature and the photograph. A photoconductive layer with the organic photoconductor is charged to a voltage of −6 kV in a darkroom with the aid of a corona discharge and is introduced into a camera in which a lens system for taking a photograph of the cardholder and a lighting device are combined with a lens system for taking a photograph of signs with the aid of the lighting device. After the image-forming exposure, the electrostatic images are developed using a liquid developer, are dried and are bonded, without a fixing step, with the aid of a hot press onto the photoconductive layer of the previously prepared surface-protective layer consisting of the polyvinyl chloride film. A transparent, non-plastic polyvinyl chloride film which can contain requisite data on its inside is then pressed onto the rear. A white covering layer which covers an aluminum foil used as the conductive layer is then pressed onto the entire surface area. The white covering layer can also be pressed directly onto the rear of the photoconductive layer containing the organic photoconductor, or a milky-white plate can be used as the base plate of the light-sensitive element.

It has also been proposed in the past that both the card cores and the protective films for the film laminates be made of thermoplastic, fusible polyvinyl chloride polymers. Multi-ply film laminates of polyvinyl chloride which are pressed at temperatures of 140° C. under high pressures of about 15 bars (kg/cm$^2$) withstand attempts at splitting to a considerable degree and thus make unauthorized alterations of exposed card data more difficult.

SUMMARY OF THE INVENTION

It is an object of the present invention to provide an identity card which is protected against forgery or alteration.

Another object of the present invention is to provide a multi-layer identity card in which the individual layers are firmly bonded to each other to resist splitting and any effort to split apart the layers is doomed to failure.

Yet another object of the present invention is to provide a multi-layer identity card wherein the bond strength of the individual layers to adjacent layers is increased.

It is also an object of the present invention to provide an identity card which is dimensionally stable at elevated temperatures and pressures used to laminate the layers of the card to each other.

Another object of the present invention is to provide an identity card having a dimensionally stable core.

It is also an object of the present invention to provide an identity card wherein the information to be carried by the card may be applied in a single step.

A further object of the present invention is to provide an identity card wherein the information to be carried by the card may be printed on at least one layer by electrophotographic or electrographic techniques.

A still further object of the present invention is to provide an identity card which can be rapidly and economically manufactured.

According to the invention, these and other objects are achieved by providing an identity card comprising at least one outer transparent covering layer and a thermoplastic core layer comprising incorporated fibrids, said card carrying at suitable points on at least one of said layers information serving to identity the cardholder and security markings for protecting against forgeries.

Preferably, the core layer is a paper enriched with polyolefin fibers. In one embodiment of the invention, the material of the core layer is a paper felt with polyethylene fibers or fibrids wherein the proportion of polyethylene fibers is at least 50% by weight and preferably at least 80% by weight.

Polyolefins, such as polypropylene and especially polyethylene, display melting properties and flow properties which lead to a homogeneous lamination of such films under the action of heat and, above all, under the additional action of pressure. No latent interfaces, which favor splitting, remain. It is also an advantage that the polyolefins are insoluble in virtually all organic solvents.

BRIEF DESCRIPTION OF THE DRAWINGS

The invention will be described in further detail with reference to the accompanying drawings wherein.

DETAILED DESCRIPTION OF PREFERRED EMBODIMENTS

Figure 1:
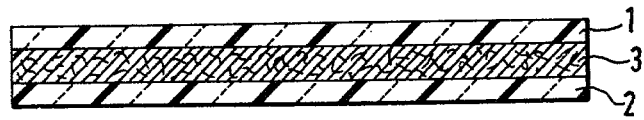
FIG. 1 is a sectional view of an identity card comprising a core layer having covering films laminated thereon.

A sectional view of one embodiment of the identity card of the invention is shown in FIG. 1. A core layer 3 is laminated on both sides with covering layers 1 and 2 which consist of transparent films. The core layer 3 is a material with incorporated fibrids or fibers, the material of the core layer preferably being a paper felt with added polyolefin fibers. Fibers suitable for mixing with cellulose fibers may consist, for example, of low-pressure polyethylene; their properties are similar to those of natural cellulose, but they behave like a thermoplastic and melt at temperatures above 135° C.

Figure 2:
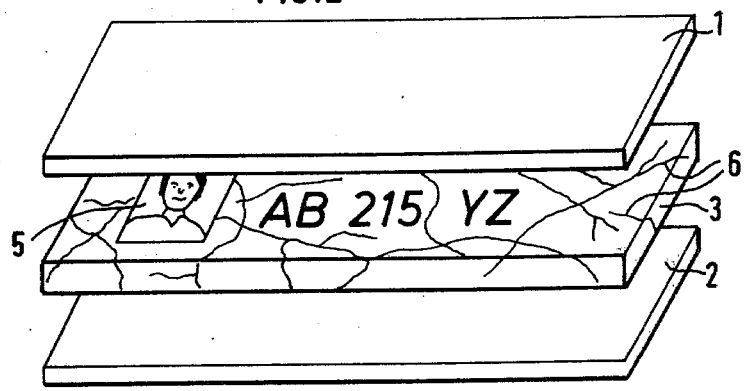
FIG. 2 is an exploded view of the identity card of FIG. 1.

In the embodiment illustrated in FIGS. 1 and 2, the card core comprises a single layer, but it may also be built up from two or more layers.

The printability of the core layer 3 can be varied within wide limits by mixng in polyethylene fibers in appropriate weight ratios, by adding pigments and by adjusting the degree of satinizing. This includes printability by techniques wherein toner images are produced such as electrophotographic copying processes with the aid of photoconductive layers or electrographic copying processes with the aid of recording electrodes. In electrophotographic copying processes, the images are transferred to the core layer 3; in electrographic processes, the images are produced directly on the core layer 3 by means of the recording electrodes and a subsequent application of toner.

As can be seen from the exploded representation in FIG. 2, the core layer 3 carries directly legible information, such as a photograph 5 of the cardholder, his name, a reference number and the like, which optionally may be applied over a security print. The fibers or fibrids 6 in core layer 3 are diagrammatically indicated in FIG. 2. Polyolefin fibrids are fine, fiber-like structures which are extensively branched. They differ from ordinary fibers by their high specific surface which, measured by the BET method, is in the range from 1 to 100 $m^2/g$, in particular 5 to 25 $m^2/g$. The BET method is described in the Journal of the Americal Chemical Society 60, page 309 (1938). The fibrids to be used have a classified length, i.e., a mean fiber length of 0.05 to 15 mm, particularly 1 to 3 mm (TAPPI Standard T 232 and 234). Fibers or fibrids of this type suitable for mixing with cellulose fibers and consisting of low-pressure polyethylene, are marketed by HOECHST AKTIENGESELLSCHAFT under the trademark HOSTAPULP. The fabrillated and highly fissured nature of HOSTAPULP gives—compared with other synthetic products—a softer, more flexible fiber and shows a narrow fiber length distribution and hence optimum dispersion properties.

The surfaces of the paper felts containing polyethylene fibrids are extensively smoothed by satinizing, but they are not closed to such an extent as in a homogeneous film. Qualitatively perfect electrophotographic copies with a half tone character for photographs can be produced on the surface by developing the charged images on a photoconductive layer with a liquid toner and transferring the toner images to the surface of the paper felts. The electrophotographic or electrographic printability of satinized papers containing polyethylene fibers or fibrids facilitates economical and rapid manufacture of identity cards, since all the data relating to the holder, including a photograph of the cardholder, can be applied in a single step.

A proportion of 50% by weight of polyethylene fibers in an identity card, consisting of a printed card core and two outer polyethylene covering films, gives very good mutual adhesion of the layers, but a mechanical separation in the region of the card core is still possible. If the proportion of polyethylene fibers is 70% by weight and if the individual layers are pressed together at a temperature of 160° C. and under a pressure of 20 bars for a period of 5 minutes, a separation is almost impossible. The mutual adhesion of the layers can be further improved by applying an increased temperature of 180° C. and a pressure of 60 bars for a period of 5 minutes.

With a proportion of 50% by weight of polyethylene fibers in the individual layer, the layer has a matt appearance similar to that of conventional white paper. As the proportion of polyethylene fibers is increased, the layers become more transparent and, at a polyethylene fiber content of 80% by weight or more, the pressed-together layers become almost completely translucent since, due to the pressings and the high proportin of polyethylene the layers increasingly correspond to homogeneous films of polyethylene. Reading-out and viewing of the data takes place in the customary manner by means of the reflection of light on a matt-white background. This background is produced by adding pigments, such as titanium dioxide, in proportions of about 8 to about 14% by weight, preferably about 10% by weight, to paper felts comprising a very high proportion of polyethylene fibers of the order of magnitude of 80% by weight or more.

When core layers having high proportions of polyethylene fibers are pressed together with covering layers consisting of polyethylene films, there is a risk, due to the high temperatures and the high pressures, of the cards spreading in width and the data being smudged as a result, so that the identity card becomes useless. to counteract this risk, the card core may be formed as two core sublayers 3' and 3", and a reinforcing layer 4 may be introduced therebetween. This reinforcing layer 4 is porous or perforated, and its material is substantially dimensionally stable at the pressing temperatures which occur, i.e., it does not display thermoplastic behavior.

As an example, an identity card having the dimensions 125 mm × 90 mm was produced which is resistant to splitting and free from distortions. The sample card has the following structure:

The upper covering layer 1 is a transparent polyethylene film of 100 μm thickness. The core layer 3' is a paper comprising 80% by weight polyethylene fibrids and 12% by weight titanium dioxide and has a thickness of 200 μm. The reinforcing layer 4 is 150 μm thick white typewriter paper perforated with holes 2 mm in diameter having a distance of 3 mm between centers of adjacent holes. The core layer 3" is a 200 μm thick paper printed with security prints and containing 80% by weight polyethylene fibrids and 12% by weight titanium dioxide. The lower covering layer 2 is again a 100 μm thick transparent polyethylene film. Instead of polyethylene fibrids, polyethylene fibers can also be used.

Depending on the particular requirements, the reinforcing layer 4 may take diverse forms. It may be a felt, such as paper, optionally comprising up to 50% by weight polyethylene fibers. It might also consist of polyester films, screen printing fabrics or other materials which display dimensionally stable behavior under the pressures and temperatures of pressing. The hole diameters and/or hole shapes can also vary within wide limits, from fractions of a millimeter up to a few centimeters, so that the optimum form of the reinforcing layer 4 can be adapted to the particular intended use. Reinforcing layers 4 of paper having perforations from 0.5 to 2 mm diameter with a distance between the centers of adjacent holes of about three times the radii of the holes have proved very suitable.

Figure 3:
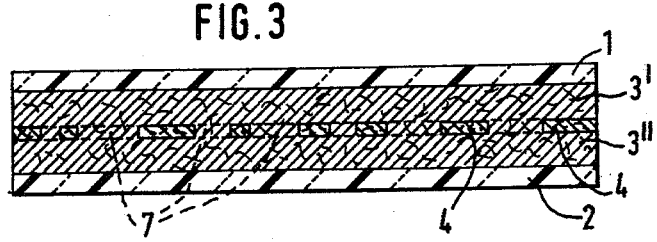
FIG. 3 is a sectional view of another identity card embodiment.
Figure 4:
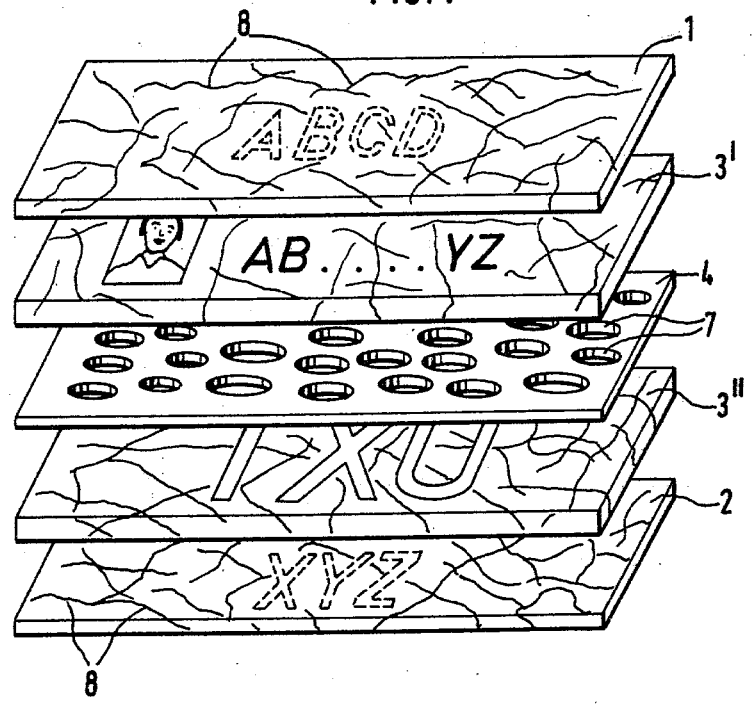
FIG. 4 is an exploded view of the identity card of FIG. 3.

In the embodiment illustrated in FIGS. 3 and 4, the covering layers 1 and 2 comprise paper containing a proportion of polyethylene of 80% by weight or more. The polyethylene fibers or fibrids 8 are diagrammatically indicated in FIG. 4. Sine covering layers of this type can be readily printed or provided with images by copying technology, the insides of the cover layers facing the core layers 3' or 3", respectively, can be provided with data and security markings. In papers of this type containing a low proportion of cellulose and/or pigment, security markings in the form of watermarks can be introduced previously during manufacture of the paper. Data and security markings are likewise imprinted on the two core layers 3' and 3" which consists of the same material as the covering layers 1 and 2.

In the reinforcing layer 4, the perforations, i.e., the holes 7, are arranged in random patterns having a hole distribution and shape which are satistically irregular but reproducible by the manufacturer. The holes 7 may also take the form of specific signs, such as coats of arms or emblems, thereby forming an additional security marking. In the edge region of the card, the reinforcing layer 4 is very extensively or continuously perforated, but is closed without any perforations on its outside edges. When the individual layers of the identity card are pressed together, the two core layers 3' and 3" are bonded together through the perforations of the reinforcing layer 4, as can be seen from FIG. 3. The reinforcing layer 4 itself can also be a carrier of further security markings in the form of security prints, or watermarks in the case of paper or mesh patterns in the case of screens.

Other known security markings, such as holograms, special internal security prints or coded data relating to the holder, can also be incorporated in the described identity cards.

It can also be advantageous to protect the polyethylene films, which although firm are soft, with harder films. To achieve this, film laminates of polyester films with polyethylene films can be used for the outer covering layers. Pressing of the individual layers is then effected on the side of the polyethylene films.

The foregoing embodiments have been described merely as examples of the invention and are not intended to be limiting. Since modifications of the disclosed embodiments may occur to persons skilled in the art, the scope of the invention is to be limited solely by the scope of the following claims.

What is claimed is:

1. An identity card comprising:
   (a) at least one outer transparent covering layer and
   (b) a thermoplastic core,
      said core being produced from a core material comprising fusible thermoplastic fibrids having a specific surface of at least 1 m$^2$ per gram measured by the BET method; said core material being printable by printing techniques wherein a toner image is produced thereon;
      said core further comprising a reinforcing layer which is perforated with holes and is dimensionally stable at a temperature at which said core material is fusible; said core material being laminated through the holes in said reinforcing layer; said reinforcing layer providing dimensional stability for said fusible core material during laminating;
   (c) said card carrying at suitable points on at least one of the component parts thereof information serving to identity the cardholder and security markings for protecting against forgeries.

2. An identity card according to claim 1, wherein said core layer comprises paper enriched with polyolefin fibers.

3. An identity card according to claim 2, wherein the polyolefin fiber-containing paper is satinized, and said information is applied thereto electrographically by means of recording electrodes.

4. An identity card according to claim 1, wherein said core comprises a paper felt comprising a material selected from the group consisting of polyethylene fibers and polyethylene fibrids.

5. An identity card according to claim 4, wherein said paper comprises at least 50% by weight polyethylene fibers.

6. An identity card according to claim 5, wherein said paper comprises at least 80% by weight polyethylene fibers.

7. An identity card according to any one of claims 4–6, wherein said paper felt comprises from 8 to 14% by weight pigment particles.

8. An identity card according to claim 1, wherein said reinforcing layer is perforated with holes having a diameter from about 0.5 mm to about 2 mm, the distance between centers of adjacent holes being about three times the radii of the holes.

9. An identity card according to claim 8, wherein said reinforcing layer comprises perforations arranged in random patterns as security markings.

10. An identity card according to claim 1, wherein the material of said reinforcing layer is dimensionally stable during assembly of the layers by lamination under pressure at elevated temperatures up to 180° C.

11. An identity card according to claim 1, wherein said reinforcing layer comprises a polyester film.

12. An identity card according to claim 1, wherein said reinforcing layer comprises a mesh screen.

13. An identity card according to claim 1, wherein said security markings comprise at least one guilloche figure.

14. An identity card according to any one of claims 1-6 or 8-12 wherein said covering layer is a paper felt comprising at least 80% by weight polyethylene fibers.

15. An identity card according to any one of claims 1-6 or 8-12 wherein information or a security marking is applied to the inside of said covering layer.

16. An identity card according to claim 1, wherein said core comprises paper enriched with polyethylene fibrids.

17. An identity card according to claim 16, wherein said core comprises from 8 to 14% by weight pigment particles.

* * * * *